(12) United States Patent
Miyairi et al.

(10) Patent No.: US 7,951,338 B2
(45) Date of Patent: *May 31, 2011

(54) CATALYTIC CONVERTER

(75) Inventors: Yukio Miyairi, Nagoya (JP); Naomi Noda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1107 days.

This patent is subject to a terminal disclaimer.

(21) Appl. No.: 11/723,309

(22) Filed: Mar. 19, 2007

(65) Prior Publication Data

US 2007/0224092 A1 Sep. 27, 2007

(30) Foreign Application Priority Data

Mar. 24, 2006 (JP) .................................. 2006-084198
Feb. 1, 2007 (JP) .................................. 2007-022856

(51) Int. Cl.
*B01D 50/00* (2006.01)
*F01N 3/02* (2006.01)
*B32B 3/12* (2006.01)

(52) U.S. Cl. ........ 422/177; 422/179; 422/180; 422/182; 428/116; 60/286

(58) Field of Classification Search .................. 422/177, 422/179, 180, 182; 428/116; 502/119; 60/286
See application file for complete search history.

(56) References Cited

U.S. PATENT DOCUMENTS

| | | | | |
|---|---|---|---|---|
| 5,664,049 A | * | 9/1997 | Kondo et al. ................. | 392/485 |
| 6,818,580 B2 | * | 11/2004 | Kumazawa et al. .......... | 501/119 |
| 7,344,770 B2 | * | 3/2008 | Hirai et al. ................... | 428/116 |
| 7,678,348 B2 | * | 3/2010 | Han et al. ..................... | 422/180 |
| 7,740,809 B2 | * | 6/2010 | Suwabe et al. ............... | 422/180 |
| 2002/0077247 A1 | | 6/2002 | Bender et al. | |
| 2004/0166035 A1 | | 8/2004 | Noda et al. | |
| 2005/0163676 A1 | * | 7/2005 | Kato ............................. | 422/179 |
| 2007/0048494 A1 | * | 3/2007 | Miyairi et al. ............... | 428/116 |

FOREIGN PATENT DOCUMENTS

| | | |
|---|---|---|
| DE | 10 2005 024 124 A1 | 11/2006 |
| EP | 0 736 503 A1 | 10/1996 |
| EP | 1 216 745 A2 | 6/2002 |
| EP | 1 340 541 A1 | 9/2003 |
| EP | 1 452 702 A2 | 9/2004 |
| EP | 1 634 646 A1 | 3/2006 |
| JP | A-2003-033664 | 2/2003 |
| WO | WO 2006/125649 A2 | 11/2006 |

* cited by examiner

*Primary Examiner* — N. Bhat
(74) *Attorney, Agent, or Firm* — Oliff & Berridge, PLC

(57) ABSTRACT

A catalytic converter having an excellent purification efficiency and small pressure loss and a method for producing the same is provided. A catalytic converter comprises a catalyst coating layer which is coated on the surface of the partition walls of the honeycomb structural body having partition walls which divide and form a plurality of cells functioning as fluid passages. 10% or more of the plurality of the cells are plugged by the plug portions which are formed at the one end or the middle of the passage, the average maximum distance of image of the honeycomb structural body is 10 μm or more and the porosity of the honeycomb structural body is 40% or more, the catalyst coating layer contains at least one oxide selected from the group consisting of alumina, ceria, titania, silica and zirconia, and also a catalyst containing at least one precious metal selected from the group consisting of platinum, rhodium and palladium, or metal exchanged zeolite or vanadium is supported in the catalyst coating layer as the catalytic active constituent, the average maximum distance of image of the catalyst coating layer is 10 μm or more, and the porosity of the catalyst coating layer is 40% or more.

8 Claims, 7 Drawing Sheets

CATALYTIC CONVERTER

TECHNICAL FIELD

The present invention relates to a catalytic converter which is used suitably for purifying a treating constituent such as carbon monoxide (CO), hydro carbon (HC), nitrogen oxides (NOx) and so on contained in the exhaust gases exhausted from engines for automobile, construction machine and industrial stationary engine, and combustion apparatus, and a method for producing the same.

BACKGROUND ART

At the present moment, a catalytic converter is used utilizing a honeycomb structural body as the catalyst support for purifying the exhaust gases exhausted from various kinds of engines and so on. The catalytic converter has a construction in which a catalyst coating layer 5 is supported on the surface of the partition walls 4 which divide and form a plurality of cells 3 of the honeycomb structural body, as shown in FIG. 10. The catalyst coating layer 5 consists mainly of oxides such as alumina, ceria, zirconia and so on, and precious metals such as platinum, rhodium, palladium and so on are supported in the ultra fine pores thereof as the catalyst active constituent. At the time of purifying the exhaust gases utilizing the catalytic converter 60 (honeycomb structural body 11), as shown in FIG. 8 and FIG. 9, it is performed that the exhaust gas is flowed into the cells 3 from the one end face 2a side, is contacted with the catalyst coating layer (not shown) on the surface of the partition walls 4, and then is flowed out to the outside from the other end face 2b side (refer to Japanese patent application laid-open 2003-33664, for example).

In case of purifying the exhaust gases utilizing these honeycomb structural bodies, it is necessary to improve the purifying efficiency by accelerating the transmission of the treating constituent contained in the exhaust gases as much as possible. In order to improve the purifying efficiency of the exhaust gases, it is necessary to decrease the hydraulic diameter of the cell, and increasing the surface area of the partition walls and so on. More concretely, the method, in which the number of cells per unit area (cell density) is increased, or the like is employed.

However, it is the fact that the sufficient catalyst performance is not obtained even by decreasing the hydraulic diameter by such increasing the cell density. In order to improve the catalyst performance much more, in these days, the study is performed to apply the plugged honeycomb structural body, in which one end of the cell is plugged and the other end of the adjacent cell is plugged alternately (to show a chequer pattern at the one end face of the honeycombs structural body) as used in the diesel particulate filter (DPF), to the catalyst support of the catalytic converter.

That is, in the honeycomb structural body in which plugging is applied to the cell, the exhaust gases flowed into from the one end face will flow out to the outside from the other end face after passing through the porous partition walls, therefore, it is possible to purify the exhaust gas by contacting the exhaust gas to the catalyst coating layer in the pores of the partition walls, if coating of the catalyst coating layer, which contains catalytic active constituent, is applied to the inner surface of the partition walls through which the exhaust gases pass. In the catalytic converter having this structure, the exhaust gas flows in the pores of the partition walls which having smaller hydraulic diameter compared with that of the cell, it is possible to make the distance between the exhaust gas and the catalyst coating layer to small, and also it is possible to increase the contact area between the exhaust gas and the catalyst coating layer, and as the result thereof, it is possible to expect the great improve of the catalyst performance.

However, for producing this kind of catalytic converter actually, coating the catalyst coating layer on the inner surface of the pores of the partition walls uniformly is very difficult, and there is a problem that sufficient catalyst performance is not shown, if the uniformity of the catalyst coating layer is damaged. Further, if trying to coat thinly the catalyst coating layer on the inner surface of the partition walls uniformly, the volume of the catalyst coating layer itself, that is, the absolute amount of the oxides constituting the catalyst coating layer is limited. Therefore, the distance between one precious metal particle and another precious metal particle supported in the catalyst coating layer or on the surface of the catalytic coating layer can not be sufficiently secured, the precious metal particle each other may start the cohesion at the time of actual use of the catalytic converter, and the catalytic activity may be lowered because of decreasing the total surface area of the precious metal particles. On the other hand, if trying to secure the absolute amount of the catalyst coating layer sufficiently, the pores of the partition walls are filled up with the catalyst coating layer, and therefore the passing resistance of the exhaust gas becomes too high.

DISCLOSURE OF THE INVENTION

The present invention is made to solve the above mentioned conventional problems, and the object of the present invention is to provide a catalytic converter having excellent purifying efficiency and low pressure loss and a method for producing the same.

To achieve the above mentioned object, a catalytic converter and the method for producing the catalytic converter are provided.

[1] A catalytic converter comprising: a porous honeycomb structural body having partition walls which divide and form a plurality of cells functioning as fluid passages, communicating from one end face to the other end face, and a catalyst coating layer coated on the partition walls, wherein 10% or more of the plurality of the cells are plugged by the plug portions which are formed at the one end or the middle of the passage, the average maximum distance of image of the honeycomb structural body is 10 μm or more and the porosity of the honeycomb structural body is 40% or more, the catalyst coating layer contains at least one oxide selected from the group consisting of alumina, ceria, titania, silica and zirconia, and also a catalyst containing at least one precious metal selected from the group consisting of platinum, rhodium and palladium, or metal exchanged zeolite or vanadium is supported in the catalyst coating layer as the catalytic active constituent, the average maximum distance of image of the catalyst coating layer is 10 μm or more, and the porosity of the catalyst coating layer is 40% or more.

[2] A catalytic converter according to [1], wherein the average maximum distance of image of the honeycomb structural body is 40 μm or more and the porosity of the honeycomb structural body is 50% or more.

[3] A catalytic converter according [1] or [2], wherein the average maximum distance of image of the catalyst coating layer is 40 μm or more, and the porosity of the catalyst coating layer is 50% or more.

[4] A catalytic converter according any one of [1] to [3], wherein 50% or more of the plurality of the cells are plugged by the plug portions which are formed at the one end or the middle of the passage of the honeycomb structural body.

[5] A catalytic converter according to any one of [1] to [4], wherein the thickness of the catalyst coating layer is 60 μm or more.

[6] A catalytic converter according to any one of [1] to [5], wherein the thickness of the partition wall is 0.35 mm or less.

[7] A catalytic converter according to any one of [1] to [6], wherein the catalyst coating layer is also coated on the inner surface of a pore of the partition wall, the amount of the catalyst coating layer coated on the inner surface of the pore of the partition wall is less than 30% by mass of the total amount of the catalyst coating layer coated on the honeycomb structural body.

[8] A catalytic converter according to any one of [1] to [7], wherein the catalyst coating layer comprises a plurality of layers and each layer has the different kind of the oxides contained and/or the catalytic active constituent supported.

[9] A method for producing a catalytic converter comprising: coating a catalyst coating layer on the surface of partition walls of a porous honeycombs structural body having partition walls which divide and form a plurality of cells functioning as fluid passages, communicating from one end face to the other end face, the method further comprising; coating a slurry of a catalyst coating layer material, in which an organic pore forming agent are mixed, on the surface of the partition walls of the honeycomb structural body, and removing the pore forming agent by rising temperature to a predetermined temperature during or after drying the coated catalyst coating layer material to form pores in the catalyst coating layer.

The catalytic converter of the present invention, at least a part of the cells of the honeycomb structural body, which is the catalyst support thereof, are plugged so that at least a part of the fluid which flowed into the cells will flow out after passing through the porous partition walls. At the same time, by coating an air permeable catalyst coating layer, which has a predetermined average maximum distance of image and porosity, on the surface of the partition walls, at the time of passing the exhaust gas through the partition walls, the exhaust gas also passes through the catalyst coating layer so that the exhaust gas contacts efficiently with the catalytic active constituent such as the precious metals supported in the catalyst coating layer, then it is possible to obtain the high purifying efficiency. And there is no need to coat the catalyst coating layer on the inner surface of the pores of the partition walls, because the contact between the exhaust gas and the catalytic active constituent such as precious metals may be occurred mainly in the catalyst coating layer on the surface of the partition walls, and therefore, it is possible to reduce the pressure loss. Furthermore, according to the method for producing the catalytic converter of the present invention, it is possible to produce easily the catalytic converter having the above mentioned predetermined average maximum distance of image and porosity.

Figure 1:
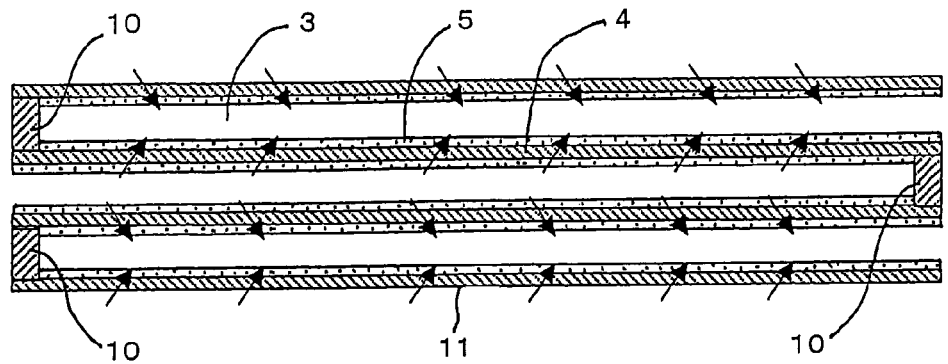
FIG. 1 is a schematic partial cross section showing an embodiment of the catalytic converter of the present invention.

REFERENCE NUMERALS $2a$, $2b$: end face, $3a$, $3b$, $3c$, $3d$: cell, 4: partition wall, 5: catalyst coating layer, 10: plugged portion, 11: honeycomb structural body, 60: catalytic converter, $t_1$: thickness of the partition wall, $t_2$: thickness of the catalyst coating layer, $v_1$, $v_2$: observing area (view field).

BEST MODE FOR CARRYING OUT THE INVENTION

The best embodiments for carrying out the present invention is herein below described, but the present invention is not limited to the embodiment described below by any means. And it should be understood that any design changes, improvements and so on are possible according to the skilled person in the art without any deviation from the concept of the present invention, and covered by the range of the present invention.

In the catalytic converter of the present invention, the honeycomb structural body used as the catalyst support for supporting the catalyst coating layer is the porous and having the partition walls which divide and form the plurality of cells functioning as fluid passages, communicating from one end face to the other end face, and 10% or more, preferably 50% or more of the plurality of the cells are plugged by the plug portions which are formed at the one end or the middle of the passage. By providing these plugging, at least one part of the exhaust gas flowed into the cells from one end face will flow out from the other end face after passing through the partition walls. Here, if the plugged cells mentioned above are less than 10% within the all cells, enough purification effect is not obtained because the amount of the exhaust gas passing through the partition wall decreases. Further, if the plugged cells mentioned above are more than 50%, more preferable purification effects is obtained because the amount of the exhaust gas passing through the partition wall increases.

FIG. 2(a) to FIG. 7(b) are the schematic views of embodiments of the honeycomb structural boy used in the present invention.

Figure 2A:
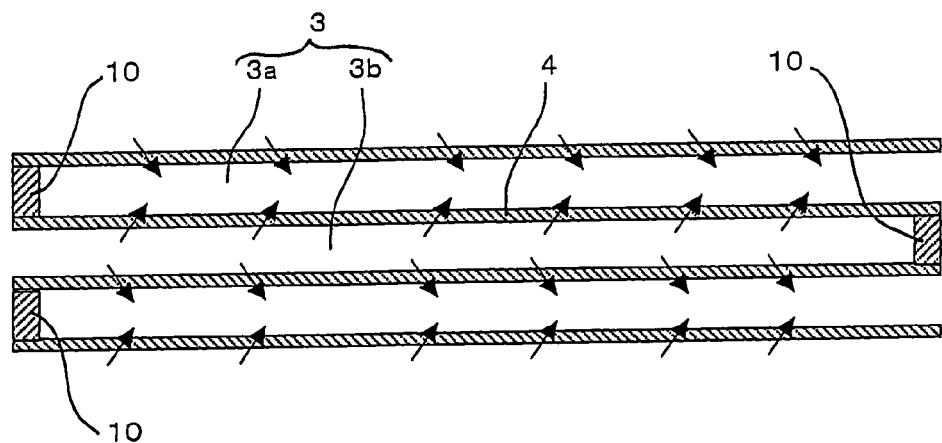
FIG. 2(a) is a schematic partial cross section showing an embodiment of the honeycomb structural body used in the present invention.
Figure 2B:
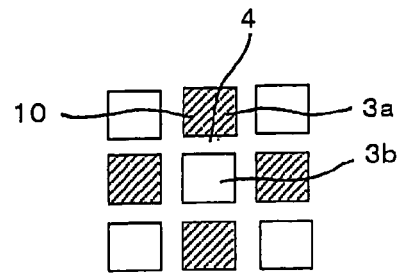
FIG. 2(b) is a schematic enlarged front elevation showing an embodiment of the honeycomb structural body used in the present invention.

In the embodiment shown in FIG. 2(a) and FIG. 2(b), the inlet end face of cells are plugged and the outlet end face of adjacent cell of the one end of the cells 3 are plugged alternately by the plug portions 10, the exhaust gas came into the cells 3b which are plugged at the outlet end face is stopped by the plug portions 10, then pass through the partition walls 4, and flow out after moving into the adjacent cells 3a which is plugged at the inlet end face.

Figure 3:
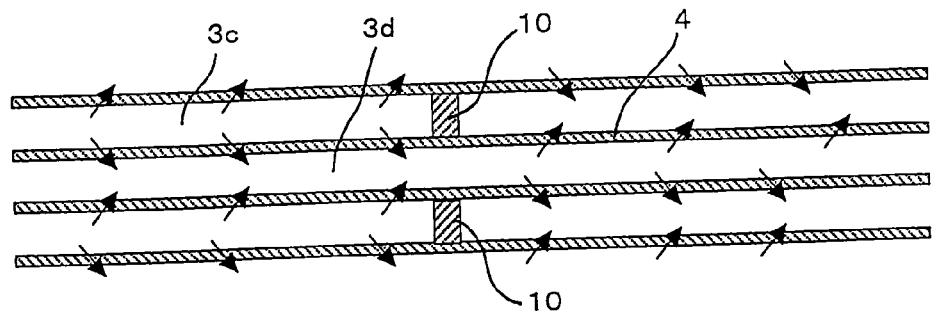
FIG. 3 is a schematic partial cross section showing an embodiment of the honeycomb structural body used in the present invention.

In the embodiment shown in FIG. 3, the plugged cells 3c by the plug portions 10 and unplugged cells 3d are disposed alternately, and the plug portions 10 are located at the middle of the fluid passage instead of the end. The exhaust gas flowed into the cells 3c which are plugged at the middle of the fluid passage passes through the partition walls 4 in front of the plug portions 10, then moves into the adjacent unplugged cells 3d. The exhaust gas moved into the unplugged cells 3d partially flow out from the outlet end of the cells 3d, the remainder of the exhaust gas return to the plugged cells 3c through the partition walls 4 again, then flow out from the outlet end of the cells 3c. In this case, a part of the exhaust gas flowed into unplugged cells 3d flows out without passing through the partition wall 4, but such exhaust gas is also purified in some extent by contacting with the catalyst coating layer coated on the surface of the partition walls 4. Like this, it is possible to reduce the pressure loss by providing unplugged cells 3d in a part.

Figure 4:
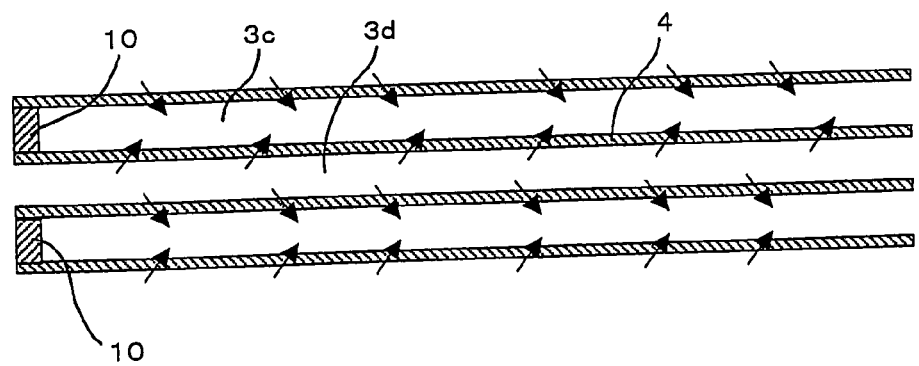
FIG. 4 is a schematic partial cross section showing an embodiment of the honeycomb structural body used in the present invention.

In the embodiment shown in FIG. 4, the plugged cells 3c by the plug portions 10 and unplugged cells 3d is disposed alternately, the plug portions 10 are disposed only at the inlet end of the cells 3c. A part of the exhaust gas flowed into the unplugged cells 3d passes through the partition walls 4 on the way of passage and moves into the adjacent plugged cells 3c, and flow out from the outlet end of the plugged cells 3c. The remainder of the gas flows out without passing through the partition wall 4, but such exhaust gas is also purified in some extent by contacting with the catalyst coating layer coated on the surface of the partition walls 4. Like this, in the same way with the embodiment shown in FIG. 3, it is possible to reduce the pressure loss by providing unplugged cells 3d in a part.

Figure 5:
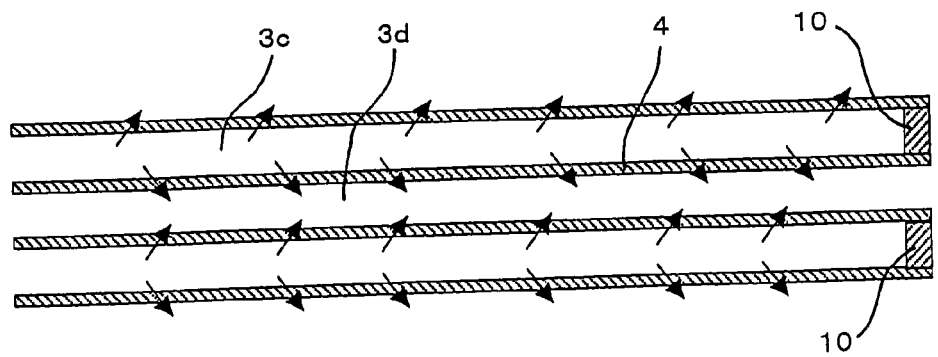
FIG. 5 is a schematic partial cross section showing an embodiment of the honeycomb structural body used in the present invention.

In the embodiment shown in FIG. 5, the plugged cells 3c by the plug portions 10 and unplugged cells 3d is disposed alternately, the plug portions 10 are disposed only at the outlet end of the cells 3c. The exhaust gas flowed into the plugged cells 3c passes through the partition walls 4 in front of the plug portions 10, then moves into the adjacent unplugged cells 3d. The main part of the exhaust gas flowed into unplugged cells 3d flows out without passing through the partition wall 4, but such exhaust gas is also purified in some extent by contacting with the catalyst coating layer coated on the surface of the partition walls 4. Like this, in the same way with the embodiment shown in FIG. 3 and FIG. 4, it is possible to reduce the pressure loss by providing unplugged cells 3d in a part.

Figure 6:
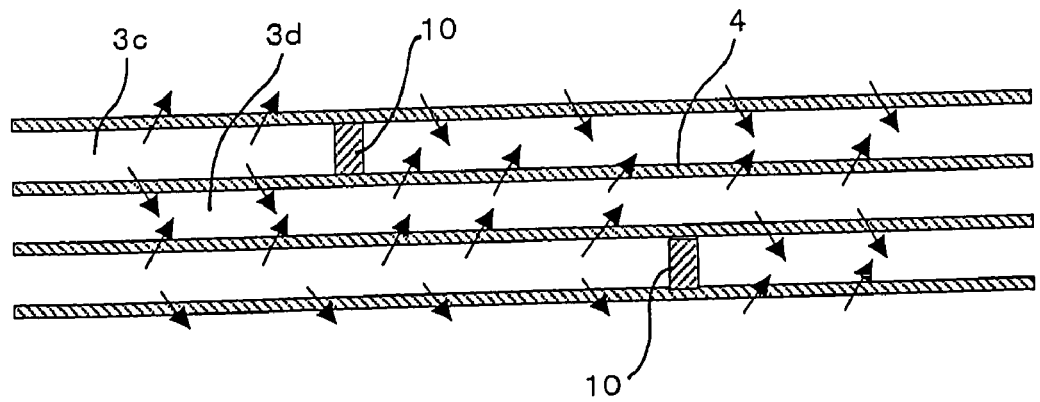
FIG. 6 is a schematic partial cross section showing an embodiment of the honeycomb structural body used in the present invention.

In the embodiment shown in FIG. 6, in the same way with the embodiment shown in FIG. 3, the plugged cells 3c by the plug portions 10 and unplugged cells 3d are disposed alternately, and the plug portions 10 are located at the middle of the fluid passage instead of the end. But in this embodiment, the plug portions 10 are disposed not in the same positions but in different positions by moving as contrary with the embodiment of FIG. 3 in which the plug portions 10 are disposed in the same longitudinal direction of the cell. There is a tendency that the amount of flow passing through the partition walls 4 increases immediately in front of the plug portions 10, the streams of the exhaust gas moving into the adjacent unplugged cells 3d through the partition walls 4 concentrate at the certain position if the plug portions 10 are disposed at the same position in the longitudinal direction of the cell as shown in FIG. 3. However, by disposing the plug portions 10 in different positions by moving in the longitudinal direction of the cell as shown in FIG. 6, the positions, in which the exhaust gas moves to the adjacent unplugged cells 3d by passing through the partition walls 4, are moved to different positions, and it is possible to soften the concentration of the streams of the exhaust gas to the certain position. Therefore, the pressure loss decreases more, and the streams of the exhaust gas in the cells are to be smooth.

Figure 7A:
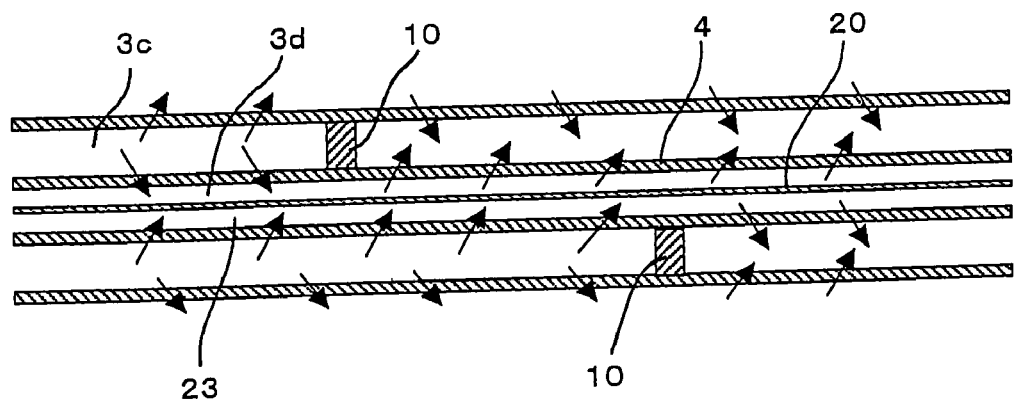
FIG. 7(a) is a schematic partial cross section showing an embodiment of the honeycomb structural body used in the present invention.
Figure 7B:
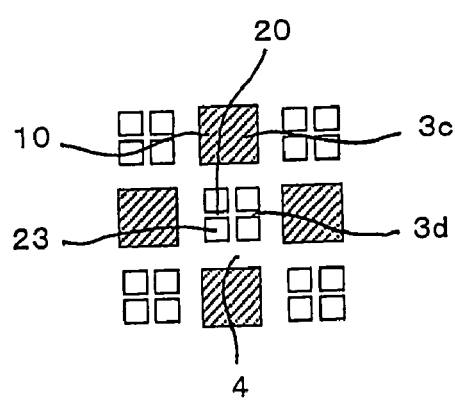
FIG. 7(b) is a schematic enlarged front elevation showing an embodiment of the honeycomb structural body used in the present invention.
Figure 8:
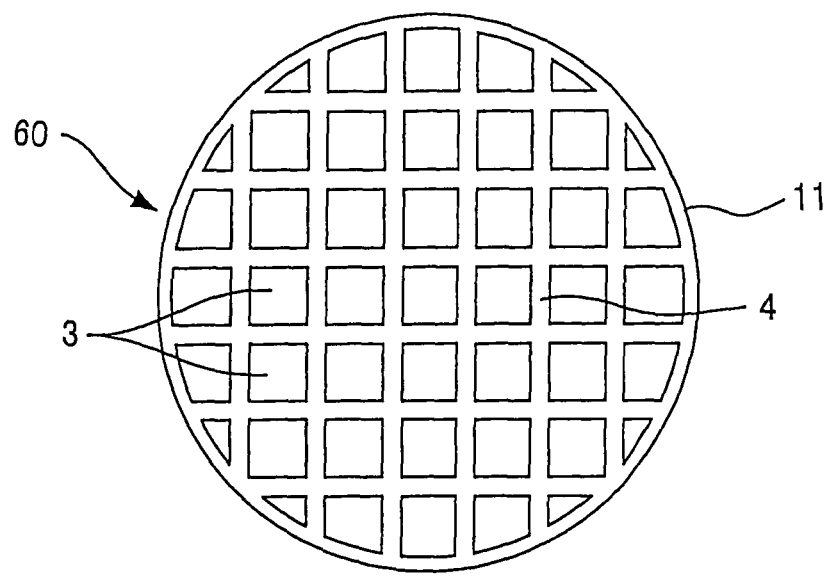
FIG. 8 is a schematic front elevation showing the conventional catalytic converter.
Figure 9:
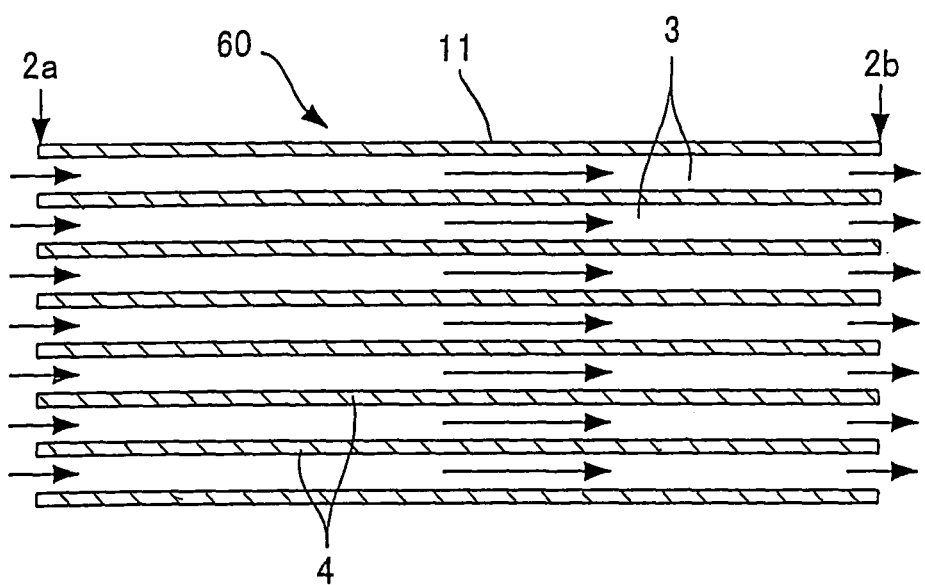
FIG. 9 is a schematic front elevation showing the conventional catalytic converter.
Figure 10:
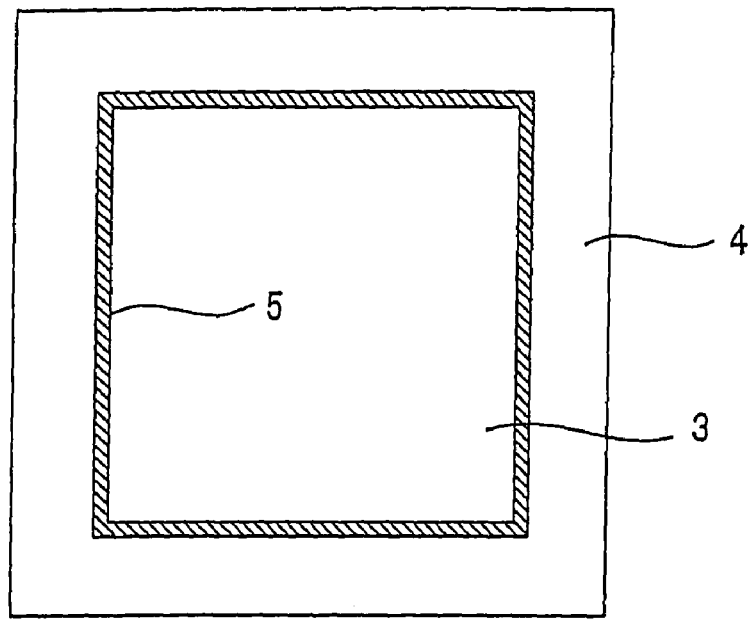
FIG. 10 is a schematic partial enlarged view showing the conventional catalytic converter.

In the embodiment shown in FIG. 7(a) and FIG. 7(b), in the same way with the embodiment shown in FIG. 6, the plugged cells 3c by the plug portions 10 and unplugged cells 3d are disposed alternately, and the plug portions 10 are located at the middle of the fluid passage, and furthermore the plug portions are disposed in different positions by moving. In addition to these, the unplugged cells 3d is divided into four smaller cells 23 by the partition walls 20. The main part of the exhaust gas flowed into unplugged cells 3d flows out without passing through the partition wall 4, but such exhaust gas is easy to contact with the catalyst coating layer coated on the surface of the partition walls 4 and the partition walls 20, by increasing the surface area by dividing the cell 3d like this.

The honeycomb structural body used in the present invention has the average maximum distance of image of 10 μm or more, preferably 40 μm or more, and the porosity of 40% or more, preferably 50% or more. If the average maximum distance of image and the porosity are less than the above mentioned values, the passing resistance is too high at the time of the exhaust gas passing through the partition walls, the pressure loss increases. Furthermore, by employing the average maximum distance of image of 50 μm or more and/or the porosity of 60% or more, it is possible to control the pressure loss sufficiently low even when the amount of exhaust gas at the time of engine operation at a high load is increased, for example.

Here, the word "pore size" means the physical property value measured by the image analysis. More concretely, the SEM pictures of the cross section of the partition wall are observed by view field observation for at least 20 samples for the view field of length×side=$t_1 \times t_1$, here $t_1$ is the thickness of the partition wall. Then, the maximum distance in a straight line is measured in the cavity in the respective view field observed, and the average value of the maximum distance in a straight line measured in the all view fields observed is to be "average maximum distance of image." And, the "porosity" is also the physical property value measured by image analysis. More concretely, the SEM pictures of the cross section of the partition wall are observed by view field observation for at least 5 samples for the view field of length×side=$t_1 \times t_1$, here $t_1$ is the thickness of the partition wall. Next, the ratio of cavity area is calculated in the respective view field observed, and also calculate 3/2 power of the obtained ratio, then the average value for the all view field observed is to be the "porosity."

Figure 11:
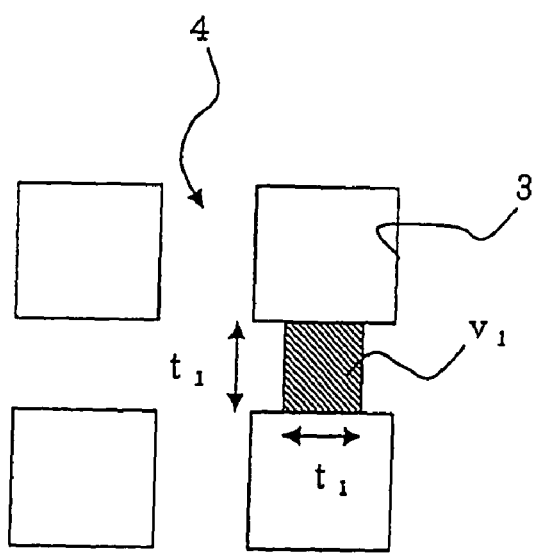
FIG. 11 is a schematic plan view showing an enlarged cross section of an embodiment of the catalytic converter of the present invention.
Figure 12:
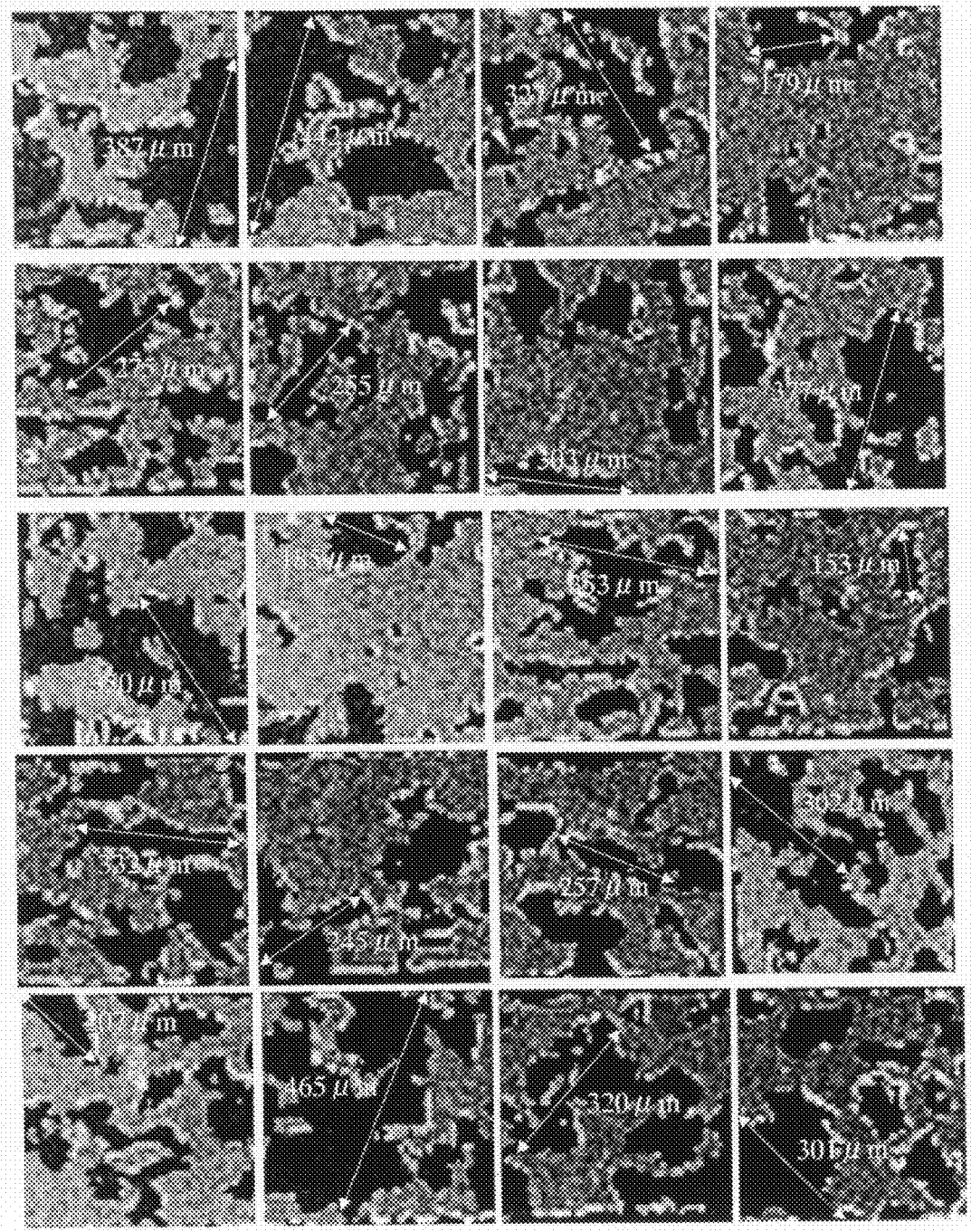
FIG. 12 is a SEM picture of a cross section of a honeycomb structural body of an embodiment of a catalytic converter of the present invention.

In the plan view in which a part of the cross section perpendicular to the axis of the honeycomb structural body is enlarged as shown in FIG. 11, for example, a range of $t_1 \times t_1$ of partition wall 4 is to be one observation range (view field) $v_1$, SEM pictures for 20 different view fields are taken, then the image analysis is done. Next, in the SEM pictures for 20 different view fields, as shown in FIG. 12, the maximum distance in a straight line in each view field is measured, and the average value is calculated. In the SEM pictures for 20 view fields shown in FIG. 12, the maximum distance in a straight line, respectively, is, from the left hand side to right hand side and from top to bottom, 387 μm, 442 μm, 327 μm, 179 μm, 275 μm, 255 μm, 303 μm, 377 μm, 350 μm, 185 μm, 353 μm, 153 μm, 332 μm, 245 μm, 257 μm, 302 μm, 207 μm, 465 μm, 320 μm, and 301 μm. In this case, the average maximum distance of image is to be 301 μm.

The SEM pictures shown in FIG. 12 are taken by magnification of 50. It is possible to use a commercially available image analysis soft ware, for example, the soft ware made by the Company COREL, the Trade Name "Paint Shop ProX." The magnification for the SEM pictures is not particularly limited, but the magnification which is possible to obtain a sharp image is acceptable and it is possible to choose any one of magnification of 10-1000.

The density of the cells of the honeycomb structural body (the cell density) is preferably 0.25-46.5 cell/cm$^2$ (1.6-300 cpsi), more preferably 1.55-15.5 cell/cm$^2$ (10-100 cpsi), and further preferably 1.55-12.4 cell/cm$^2$ (10-80 cpsi). If the cell density is less than 0.25 cell/cm$^2$, there is a tendency of shortage of contact efficiency between the exhaust gas and the catalyst coating layer, in case of using as the catalyst support. On the other hand, if the cell density is larger than 46.5 cell/cm$^2$, there is a tendency of increasing the pressure loss. Furthermore, if the cell density is less than 15.5 cell/cm$^2$, it is possible to reduce the pressure loss lower, even if the amount of the exhaust gas increases. Here, the "cpsi" is the abbreviation of the "cells per square inch", and it is the unit showing the number of cells per square inch. 10 cpsi is about 1.55 cell/cm$^2$.

The thickness of the partition wall is preferably 0.35 mm or less, more preferably 0.2 mm (8 μmil) or less. If the thickness of the partition wall is 0.35 mm or less, it is possible to obtain the good light-off performance (a property which is possible to reach the catalyst active temperature from the low temperature quickly), in case of using the honeycomb structural body as the catalyst support for the catalytic converter, because it is possible to control the heat capacity of the honeycomb structural body. Here, 1 mil is 1-thousandth inch and about 0.025 mm. If the thickness of the partition wall is 0 mm, it means the wall-flow type catalytic converter in the solid catalyst. Even in this case, it shows the same effects (high purification performance, low pressure loss) of the catalytic converter of the present invention, if it satisfies the conditions of the catalyst coating layer of the present invention. But, it has a disadvantage that the mechanical strength is not secured sufficiently.

The common logarithm standard deviation of the pore size distribution of the partition wall (the pore size distribution σ) is preferably 0.1-0.6, more preferably 0.2-0.6. If the pore size distribution σ is less than 0.1, there is a tendency that the partition wall passing pressure loss increases. On the other hand, if the pore size distribution σ is larger than 0.6, there is a tendency that the purification performance decreases, because the exhaust gas flows only into the larger pores.

The "pore size distribution" at the time of calculating "the common logarithm standard deviation of the pore size distribution", the value measured by the mercury porosimeter is used. The common logarithm standard deviation (sd in the following equation (4); standard deviation) is calculated by using the following equations (1)-(4) about obtained pore size distribution. Here, the differential pore volume shown as "f" in the following equation (2) and (3) is explained like this, for example, if the pore volume of pores having pore size less than Dp1 (accumulation of pore size 0–Dp1) is V1 and the pore volume of pores having pore size less than Dp2 (accumulation of pore size 0–Dp2) is V2, the differential pore volume f2 is the value shown by f2=V2−V1. In the following equations (1)-(4), "Dp" represents the pore size (μm), "f" represents the differential pore volume (mL/g), "x" represents the common logarithm of pore size Dp, "xav" represents the average value of x, "s$^2$" represents the dispersion of x, "sd" represents the standard deviation of x (the common logarithm standard deviation of the pore size distribution), respectively. And "s" in the following equations represents the pore size distribution σ.

[equation 1]

$$x = \log Dp \quad (1)$$

$$xav = \Sigma xf/\Sigma f \quad (2)$$

$$s^2 = \Sigma x^2 f/\Sigma f - xav^2 \quad (3)$$

$$sd = \sqrt{s^2} \quad (4)$$

As the material which constitutes the honeycomb structural body, it is possible to raise the material having ceramics as the main constituent, or sintered metals, as preferable examples. And in case of the honeycomb structural body consisting of the materials having ceramics as the main constituent, it is possible to raise silicon carbide, cordierite, aluminum titanate, sialon, mullite, silicon nitride, zirconium phosphate, zirconia, titania, alumina or silica, or combination thereof, as the ceramics, as preferable example. Especially, ceramics such as silicon carbide, cordierite, mullite, silicon nitride, alumina or the like is preferable from the alkali resistant property point of view. Above all, oxide ceramics is preferable from cost point of view, too.

It is preferable the thermal expansion coefficient of the longitudinal direction of the cell between 40-800° C. is less than $1.0 \times 10^{-6}$/° C., more preferable less than $0.8 \times 10^{-6}$/° C., further preferable less than $0.5 \times 10^{-6}$/° C. If the thermal expansion coefficient of longitudinal direction of cells between 40-800° C. is less than $1.0 \times 10^{-6}$/° C., it is possible to control the occurred thermal stress under the acceptable range at the time of disposed to the high temperature exhaust gas (exhaust gas), and it is possible to prevent the thermal stress breakage of the honeycomb structural body.

As the cross sectional shape of the honeycomb structural body cut at the perpendicular face to the longitudinal direction of the cell, it is preferable to use the shape which matches the inner shape of the exhaust duct to be equipped. Concretely, it is possible to raise circle, oval, race track, trapezoid, triangle, square, hexagonal, and variant configurations which are asymmetry. Above all, circle, oval and race track are preferable.

FIG. 1 is a schematic partial cross section showing an embodiment of the catalytic converter of the present invention. The catalytic converter of the present invention has a catalyst coating layer coated on the partition walls 4 of the honeycomb structural body 11 which has predetermined plugged cells 3 by the plug portions 10 as mentioned above. The catalyst coating layer contains at least one oxide selected from the group consisting of alumina ($Al_2O_3$), ceria ($CeO_2$), titania ($TiO_2$), silica ($SiO_2$) and zirconia ($ZrO_2$), and also a catalyst containing at least one precious metal selected from the group consisting of platinum (Pt), rhodium (Rh) and palladium (Pd), or metal exchanged zeolite or vanadium (V) is supported in the catalyst containing layer as the catalytic active constituent.

Also, the catalyst coating layer is porous having air permeability, the exhaust gas also passes through the catalyst coating layer on the partition walls at the same time when the exhaust gas-passes through the partition walls, it is possible to obtain high purification efficiency by making the exhaust gas to contact with the catalytic active constituent such as precious metals and so on supported on the catalyst coating layer. There is substantially no need to coat the catalyst coating layer on the inner surface of the pores in the partition walls, because the contact between the exhaust gas and the catalytic active constituent such as precious metals and so on is made in the catalyst coating layer mainly. Therefore, it is possible to avoid the difficulty of manufacturing process to coat the catalyst coating layer uniformly on the inner surface of pores in the partition walls, and also it is possible to avoid the problem narrowing the pores by catalyst coating layer coated on the inner surface of the pores of the partition walls and increasing the passing resistance of the exhaust gas.

The catalyst coating layer has, as same with the honeycomb structural body, the average maximum distance of image of 10 μm or more, more preferably 40 μm or more, and the porosity of 40% or more, preferably 50% or more. If the average maximum distance of image and the porosity are less than the above mentioned values, the passing resistance is too high at the time of the exhaust gas passing through the partition walls, the pressure loss increases.

Here, the word "pore size" means the physical property value measured by the image analysis. More concretely, the SEM pictures of the cross section of the catalyst coating layer are observed by view field observation for at least 20 samples for the view field of length×side=$t_2 \times t_2$, here $t_2$ is the thickness of the partition wall. Then, the maximum distance in a straight line is measured in the cavity in the respective view field observed, and the average value of the maximum distance in a straight line measured in the all view fields observed is to be "average maximum distance of image." And, the "porosity" is also the physical property value measured by image analysis. More concretely, the SEM pictures of the cross section of the catalyst coating layer are observed by view field observation for at least 5 samples for the view field of length×side=$t_2 \times t_2$, here $t_2$ is the thickness of the partition wall. Next, the ratio of cavity area is calculated in the respective view field observed, and also calculate 3/2 power of the obtained ratio, then the average value for the all view field observed is to be the "porosity."

Figure 13:
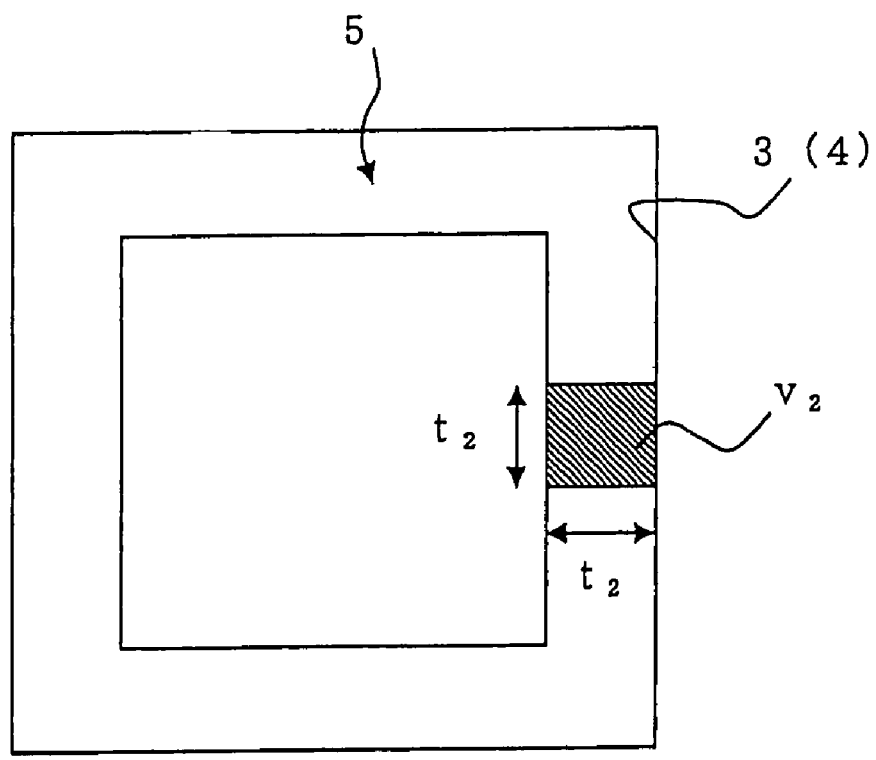
FIG. 13 is a schematic plan view of an enlarged cross section of a part of an embodiment of a catalytic converter of the present invention.

In the plan view in which a part of the cross section of the catalytic converter is enlarged as shown in FIG. 13, for example, a range of $t_2 \times t_2$ of the catalyst coating layer 5 is to be one observation range (view field) $v_2$, SEM pictures for 20 different view fields are taken, then the image analysis is done. Next, in the SEM pictures for 20 different view fields, as is same with FIG. 12, the maximum distance in a straight line in each view field is measured, and the average value is calculated.

The common logarithm standard deviation of the pore size distribution of the catalyst coating layer (the pore size distribution σ) is preferably 0.1-0.6, more preferably 0.2-0.5. If the pore size distribution σ is less than 0.1, there is a tendency that the catalyst coating layer passing pressure loss increases. Here, if the pore size distribution σ is 0.2 or more, there is an advantage that it is possible to control the pressure loss within the acceptable range even at the time of engine operation at a high load. On the contrary, if the pore size distribution σ is larger than 0.6, there is a tendency that the catalyst particles are easily detached off from the larger pore portion. If 0.5 or less, it is possible to prevent the aggravation of purifying performance in which the exhaust gas selectively flows in the larger pores. That is, if the deviation of the pore size distribution is small (that is, the distribution is sharp), there is no existence of larger pores (or existence in little numbers), therefore, it is possible to prevent the aggravation of purifying performance in which the exhaust gas selectively flows in the giant pores. Incidentally, the common logarithm standard deviation of the pore size distribution of the catalyst coating layer is possible to obtain as likewise the common logarithm standard deviation of the pore size distribution of the partition walls, as mentioned above.

The thickness of the catalyst coating layer coated on the surface of the partition walls of the honeycomb structural body is preferably 60 μm or more. In the catalytic converter of the present invention, the purification reaction by contacting the exhaust gas and the precious metals as the catalytic active constituent is made mainly in the pores of the catalyst coating layer, therefore, it is necessary to give thickness in a certain degree to the catalyst coating layer, but if less than 60 μm of the thickness, there may not be possible to give enough contact area. In the present specification, the "thickness of the catalyst coating layer" means the thickness from the cell corner to the center of the cell direction in the cross section, if the cell has polygonal such as square or octagonal shape in cross section.

In the catalyst coating layer, a catalyst containing at least one precious metal of Pt (platinum), Rh (rhodium) and Pd (palladium), or metal exchanged zeolite or V (vanadium) is supported. In case for obtaining the catalytic converter having the three-way catalyst performance, it is preferable to support at least one precious metal mentioned above. Among these precious metals, Rh is preferable for constant activity under high temperature, particularly from the view point of purification performance for NOx, Pd is preferable for increasing the light-off performance to the oxygen rich exhaust gas. In case for obtaining the catalytic converter having the NOx selective reduction performance, it is preferable to support metal exchanged zeolite or the V (vanadium) containing catalyst such as vanadium oxide.

The catalytic active constituent such as the precious metals are coated on the surface of the partition walls of the honeycomb structural body in the condition of dispersedly supported on the particles of the oxides, normally. As the oxides, $Al_2O_3$ is preferable, but $CeO_2$, $TiO_2$, $SiO_2$, $ZrO_2$ is possible to use. These oxides are possible to use alone, in combination of at least two, or compound thereof. Further, it is possible to add the rare earth materials into the oxide particles and/or the catalyst coating layer for improving the heat resistance.

As the $Al_2O_3$, γ $Al_2O_3$ is preferable to use. θ $Al_2O_3$, δ $Al_2O_3$, α $Al_2O_3$ or the like is also possible to use. Also, $Al_2O_3$ gel (xerogel, aerogel, cryogel and so on) made by sol-gel method can preferably be used. In this case, it is possible to let the catalytic active constituent such as the precious metals and so on contain during the preparing process of gel, and also it is possible to let the catalyst support to the gel after the preparing the $Al_2O_3$ gel. If there is a process in which $Al_2O_3$ gel contacts to the liquid such as water or the like during the manufacturing process of the catalytic converter, it is preferable to use the cryogel which is water resistance.

As mentioned above, it is not necessary to coat the catalyst coating layer on the inner surface of the pores of the partition walls, but normally some amount of the material for the catalyst coating layer may come into the pores of the partition walls during the coating process of the catalyst coating layer on the partition walls, the catalyst coating layer may also be coated partially on the inner surface of the pores. In this case, it is preferable that the amount of the catalyst coating layer coated on the inner surface of the pores of the partition walls is less than 30% by mass of the total amount of the catalyst coating layer coated to the honeycomb structural body. If this is 30% by mass or more, the pores of the partition walls may be narrowed by the catalyst coating layer, and the passing resistance of the exhaust gas passing through the partition walls might be too high.

The catalyst coating layer may be constituted by the plurality of layers, and in this case, it is possible to contain the different kinds of oxide contained and/or catalytic active constituent supported in layer by layer. For example, $CeO_2$ having functions of storage and discharge oxygen contributes improvement of three-way performance, therefore $CeO_2$ is possible to use as the oxide constituting the catalyst coating layer. And Rh accelerates NOx decomposition reaction and NOx reduction reaction, therefore Rh is a useful precious metal, but Rh easily reacts with $CeO_2$ to form the solid solution which causes of the catalytic inactivity. Therefore, it is preferable to use both materials in the different layers in separation. Furthermore, Pt has a function which improves the light-off performance, so it is one of preferable embodiment that Pt is to be supported in the layer which easily contacts with the exhaust gas and the other precious metals are supported in the other layers.

Furthermore, in case of composing the catalyst coating layer of plurality of layers, each layer may have different average pore size by layer and layer. For example, by adjusting the average maximum distance of image in each layer so that the average maximum distance of image is larger and larger from the surface layer (the layer exposed in the cell) to the basic layer (the layer directly contacts with the partition wall), it is possible to make the flow of the exhaust gas passing through the partition walls more uniformly, and utilize the catalyst coating layer more efficiently.

A method for producing a catalytic converter characterized in that the method comprising coating a catalyst layer on the surface of partition walls of a porous honeycombs structural body having partition walls which divide and form a plurality of cells, which form passages of a fluid flowing communicating therethrough, communicating from one end face to the other end face, further comprising a step of forming pores in the catalyst coating layer by coating a slurry of a catalyst coating layer material, in which a pore forming agent are mixed, on the surface of the partition walls of the honeycomb structural body, and by oxidizing to remove the pore forming agent by rising temperature to a predetermined temperature during or after drying the coated catalyst coating layer material.

Here, the plug portion may be arranged before coating the catalyst coating layer during the manufacturing process of the honeycomb structural body, also may be arranged after coating the catalyst coating layer. From the view point of restraining the adhering the catalysts to the inner surface of pores, it is preferable to arrange the plug portion after coating the catalyst coating layer. In this case, however, the plug portion should be solidified by the temperature range which does not deteriorate the catalyst coated. On the other hand, in case of arranging the plug portion before coating the catalyst coating layer, there is no need to worry about the deterioration of the catalyst at the time of solidification of the plug portion. Therefore, it is possible to solidify the plug portion by setting appropriate temperature freely. The solidification can be done preferably by firing at the same time with the honeycomb structural body, for example.

The porous catalyst coating layer having air permeability can easily be formed by mixing an organic pore forming agent in the slurry of the catalyst coating layer which is used for forming the catalyst coating layer, and forming the pores in the catalyst coating layer by oxidation removing the pore forming agent. As the organic pore forming agent, a starch, a foaming resin and so on are possible to use preferably, for example.

Here, the porosity of the catalyst coating layer formed by the present method can be adjusted by controlling the amount or the like of the pore forming agent to be mixed. Also, the average maximum distance of image of the catalyst coating layer is possible to adjust by controlling the average particle diameter of the oxides which is main part of the catalyst coating layer. If the average maximum distance of image of the catalyst coating layer is selected to be 40 μm, the particles which have the average particle diameter of 40 μm same with that of the average maximum distance of image are used as the catalyst coating layer material. Incidentally, the coating method for coating the slurry of the catalyst coating layer to the surface of the partition walls of the honeycomb structural body, it is possible to use the conventionally known method such as the aspiration method.

EXAMPLE

The present invention will be explained in more concretely by examples and comparative examples below, but the present invention is not restricted at all by these examples.

[The Average Maximum Distance of Image]:

The average maximum distance of image of the partition walls of the honeycomb structural body and the catalyst coating layer are calculated by measuring the pore sizes by the image analysis. More concretely, the SEM pictures of the cross section of the partition wall are observed by view field observation for at least 20 samples respectively for the view field of length×side=$t_1 \times t_1$ and for the view field of length×side=$t_2 \times t_2$, here $t_1$ is the thickness of the partition wall and the $t_2$ is thickness of the catalyst coating layer. Then, the maximum distance in a straight line is measured in the cavity in the respective view field observed, and the average value of the maximum distance in a straight line measured in the all view fields observed is to be "average maximum distance of image."

[The Standard Deviation of the Pore Size Distribution σ]:

The pore size distribution is measured by using the mercury porosimeter (made of the Micromeritics Corporation, the Trade Name: Auto Pore III, Model 9405), and the standard deviation of the pore size distribution (pore size distribution σ) is calculated.

[Porosity]:

Measured by the image analysis. More concretely, the SEM pictures of the cross section of the partition wall are observed by view field observation for at least 5 samples respectively for the view field of length×side=$t_1 \times t_1$, and for the view field of length×side=$t_2 \times t_2$, here $t_1$ is the thickness of the partition wall and $t_2$ is the thickness of the catalyst coating layer. Next, the ratio of cavity area is calculated in the respective view field observed, and also calculate 3/2 power of the obtained ratio, then the average value for the all view field observed is to be the "porosity."

Example 1

The plugging is done in the pattern as shown in FIG. 2(a) and FIG. 2(b) to the honeycomb structural body having a diameter of 105.7 mm, length of 114.2 mm, volume of 1 liter, thickness of the partition wall of 8 mil (0.203 mm), cell density of 300 cpsi (46.5 cells/$cm^2$), the average maximum distance of image of 40 μm and the porosity of 60%. Then, the pulverized particles (the specific surface area of 50 $m^2/g$) having average particle diameter of 45 μm are obtained by wet pulverizing the mixture of γ Al$_2$O$_3$ and CeO$_2$ having the initial average particle diameter of 150 μm by a ball mill. And Pt and Rh are supported in the pores of the pulverized particles by immersing the pulverized particles into the solution containing Pt and Rh. Next, the coating slurry is obtained by adding the foaming resin as the pore forming agent, further adding acetic acid and water to the pulverized particles which support the Pt and Rh thus obtained. Further, the slurry is coated on the partition walls by vacuum aspirating the coating slurry from the outlet end face of the honeycomb structural body, then the catalytic converter is completed by drying, firing 3 hours by 600° C. to form the catalyst coating layer (average thickness of 30 μm). Here, the amount of the oxides coated (γ Al$_2$O$_3$ and CeO$_2$) is 150 g per 1 liter of the volume of the honeycomb structural body and the amount of the precious metal is 2 g for the Pt per 1 liter of the honeycomb structural body and 0.5 g for Rh per 1 liter of the honeycomb structural body. Furthermore, the average maximum distance of image of the catalyst coating layer is 45 μm as same with the average particle diameter of the pulverized particles.

The exhaust amount of CO, HC and NOx is measured by mounting the catalytic converter on the exhaust system of the automobile equipped with exhaust amount of 2 liter engine, operating by the United States emission control operating mode on the chassis dynamo. The pressure loss at the time of full loading is also measured. The measured results are shown in Table 1 as the relative value to the measured value of the following comparative example 1 in which the value is expressed as 1.

Comparative Example 1

The catalytic converter is obtained by the same preparation process with the Example 1, except using the pulverized particle having the average particle diameter of 5 μm and forming the catalyst coating layer in the pores of the partition walls by coating the coating slurry in the pores of the partition walls. The average maximum distance of image of the catalyst coating layer is 5 μm as same with the average particle diameter of the pulverized particles. About the catalytic converter, the exhaust amount of CO, HC and NOx, and the pressure loss are measured as same with the Example 1, then, the measured results are shown in Table 1 as 1 for the standard for the other Examples and the Comparative Examples.

Example 2

The catalytic converter is obtained by the same preparation process with the Example 1, except the amount of the oxides coated (γ Al$_2$O$_3$ and CeO$_2$) is to be 400 g per 1 liter of the volume of the honeycomb structural body (the average thickness of the catalyst coating layer of 150 μm). About the catalytic converter, the exhaust amount of CO, HC and NOx, and the pressure loss are measured as same with the Example 1, then, the measured results are shown in Table 1 as the relative value to the measured value of the above mentioned Comparative Example 1 in which the value is expressed as 1.

Comparative Example 2

The catalytic converter is obtained by the same preparation process with the Example 2, except using the pulverized particle having the average particle diameter of 5 μm and forming the catalyst coating layer in the pores of the partition walls by coating the coating slurry in the pores of the partition walls. About the catalytic converter, the exhaust amount of CO, HC and NOx, and the pressure loss are measured as same with the Example 1, then, the measured results are shown in Table 1 as the relative value to the measured value of the above mentioned Comparative Example 1 in which the value is expressed as 1.

Examples 3-Example 6

The catalytic converters are obtained by the same preparation process with the Example 2, except employing the pattern of the plugging as shown in the FIG. 3 (Example 3), FIG. 4 (Example 4), FIG. 5 (Example 5) and FIG. 6 (Example 6). About these catalytic converters, the exhaust amount of CO, HC and NOx, and the pressure loss are measured as same with the Example 1, then, the measured results are shown in Table 1 as the relative value to the measured value of the above mentioned comparative example 1 in which the value is expressed as 1.

TABLE 1

| | | Honeycomb structural body | | | Catalyst coating layer | | | | | | Exhaust amount | | | Pressure |
| --- | --- | --- | --- | --- | --- | --- | --- | --- | --- | --- | --- | --- | --- | --- |
| | Plug type | Partition wall thickness (mm) | Average maximum distance of image (μm) | Porosity (%) | Oxide amount (g/L) | Pt amount (g/L) | Rh amount (g/L) | Average maximum distance of image (μm) | Porosity (%) | Coating position | CO | HC | NO$_x$ | loss |
| Example 1 | FIG. 2(a) FIG. 2(b) | 0.203 | 40 | 60 | 150 | 2 | 0.5 | 45 | 60 | Surface of partition wall | 0.8 | 0.7 | 0.6 | 0.9 |
| Com. Example 1 | FIG. 2(a) FIG. 2(b) | 0.203 | 40 | 60 | 150 | 2 | 0.5 | 5 | 35 | Inside of pore of partition wall | 1 | 1 | 1 | 1 |
| Example 2 | FIG. 2(a) FIG. 2(b) | 0.203 | 40 | 60 | 400 | 2 | 0.5 | 45 | 60 | Surface of partition wall | 0.5 | 0.4 | 0.2 | 1 |
| Com. Example 2 | FIG. 2(a) FIG. 2(b) | 0.203 | 40 | 60 | 400 | 2 | 0.5 | 5 | 35 | Inside of pore of partition wall | 1.6 | 1.5 | 1.4 | 2.5 |
| Example 3 | FIG. 3 | 0.203 | 40 | 60 | 400 | 2 | 0.5 | 45 | 60 | Surface of partition wall | 0.6 | 0.6 | 0.5 | 0.5 |

TABLE 1-continued

| | | Honeycomb structural body | | | Catalyst coating layer | | | | | | Exhaust amount | | | Pressure |
| --- | --- | --- | --- | --- | --- | --- | --- | --- | --- | --- | --- | --- | --- | --- |
| | Plug type | Partition wall thickness (mm) | Average maximum distance of image (μm) | Porosity (%) | Oxide amount (g/L) | Pt amount (g/L) | Rh amount (g/L) | Average maximum distance of image (μm) | Porosity (%) | Coating position | CO | HC | NO$_x$ | loss |
| Example 4 | FIG. 4 | 0.203 | 40 | 60 | 400 | 2 | 0.5 | 45 | 60 | Surface of partition wall | 0.6 | 0.5 | 0.4 | 0.4 |
| Example 5 | FIG. 5 | 0.203 | 40 | 60 | 400 | 2 | 0.5 | 45 | 60 | Surface of partition wall | 0.6 | 0.6 | 0.3 | 0.5 |
| Example 6 | FIG. 6 | 0.203 | 40 | 60 | 400 | 2 | 0.5 | 45 | 60 | Surface of partition wall | 0.5 | 0.4 | 0.2 | 0.6 |

Com. Example = Comparative Example

As shown in Table 1, in the Example 1-Example 6 in which the catalyst coating layer is coated on the partition walls, the exhaust amount of CO, HC and NOx is low and they show the excellent purification performance as compared with that of Comparative Example 1 and Comparative Example 2 in which the coating layer are coated on the inner surface of the pores of the partition walls. And the Example 1 and the Comparative Example 1 are same in the plugging pattern and the amount of the coated oxides, but the Example 1 shows the lower pressure loss than that of the Comparative Example 1. Similarly, the Example 2 and the Comparative Example 2 are same in the plugging pattern and the amount of the coated oxides, but the Example 2 shows the lower pressure loss than that of the Comparative Example 2. The reasons of these are following, that is, in the Example 1 and the Example 2, the catalyst coating layer is coated on the surface of the partition walls instead of the inner surface of the pore of the partition walls, the pore of the partition walls is not narrowed by the catalyst coating layer, therefore, the passing resistance at the time of passing the exhaust gas through the partition walls is to be low. Example 3-Example 6, in which unplugged cells exist, show lower pressure loss as compared with that of the Comparative Example 2 in which plugging is made to the all cells at the outlet end face.

Example 7-Example 9 and Comparative Example 3

The catalytic converters are obtained by the same preparation process with the Example 2, except employing the plugging pattern as shown in FIG. 3, and having the ratio of the plugged cells to the all cells are 6% (Comparative Example 3), 12% (Example 7), 30% (Example 8) and 52% (Example 9). By mounting the catalytic converters thus obtained on the exhaust system of the automobile equipped with exhaust amount of 2 liter engine, and by operating by the United States emission control operating mode on the chassis dynamo, the content of HC in the exhaust gas is measured in front and after the catalytic converter, respectively, then the purification ratio is calculated from the measured data and are shown in Table 2. Incidentally, as to the catalytic converter of the Comparative Examples 2 and the Example 2 in which all cells are plugged at the inlet side or outlet side, that is the ratio of the plugged cells is 100%, the purification ratio is measured. The purification ratio of HC shown in Table 2 is the relative value in which the purification ratio of the Comparative Example 2 is to be 1.

Example 10-Example 12 and Comparative Example 4

The catalytic converters are obtained by the same preparation process with the Example 2, except employing the plugging pattern as shown in FIG. 4, and having the ratio of the plugged cells to the all cells are 6% (Comparative Example 4), 12% (Example 10), 30% (Example 11) and 52% (Example 12). The purification ratio of HC is measured as same with the Example 7-Example 9 and the Comparative Example 3 as to these catalytic converters, and shown in Table 2.

Example 13-Example 15 and Comparative Example 5

The catalytic converters are obtained by the same preparation process with the Example 2, except employing the plugging pattern as shown in FIG. 5, and having the ratio of the plugged cells to the all cells are 6% (Comparative Example 5), 12% (Example 13), 30% (Example 14) and 52% (Example 15). The purification ratio of HC is measured as same with the Example 7-Example 9 and the Comparative Example 3 as to these catalytic converters, and shown in Table 2.

Example 16-Example 18 and Comparative Example 6

The catalytic converters are obtained by the same preparation process with the Example 2, except employing the plugging pattern as shown in FIG. 6, and having the ratio of the plugged cells to the all cells are 6% (Comparative Example 6), 12% (Example 16), 30% (Example 17) and 52% (Example 18). The purification ratio of HC is measured as same with the Example 7-Example 9 and the Comparative Example 3 as to these catalytic converters, and shown in Table 2.

TABLE 2

| | Plug type | Percentage of plugged cell (%) | Percentage of unplugged cell (%) | HC purification rate |
| --- | --- | --- | --- | --- |
| Com. Example 2 | FIG. 2(a) FIG. 2(b) | 100 | 0 | 1 |
| Example 2 | FIG. 2(a) FIG. 2(b) | 100 | 0 | 2.5 |
| Com. Example 3 | FIG. 3 | 6 | 94 | 0.9 |
| Example 7 | FIG. 3 | 12 | 88 | 1.5 |

TABLE 2-continued

|  | Plug type | Percentage of plugged cell (%) | Percentage of unplugged cell (%) | HC purification rate |
|---|---|---|---|---|
| Example 8 | FIG. 3 | 30 | 70 | 1.6 |
| Example 9 | FIG. 3 | 52 | 48 | 1.8 |
| Com. Example 4 | FIG. 4 | 6 | 94 | 0.7 |
| Example 10 | FIG. 4 | 12 | 88 | 1.2 |
| Example 11 | FIG. 4 | 30 | 70 | 1.5 |
| Example 12 | FIG. 4 | 52 | 48 | 1.6 |
| Com. Example 5 | FIG. 5 | 6 | 94 | 0.8 |
| Example 13 | FIG. 5 | 12 | 88 | 1.3 |
| Example 14 | FIG. 5 | 30 | 70 | 1.7 |
| Example 15 | FIG. 5 | 52 | 48 | 1.9 |
| Com. Example 2 | FIG. 6 | 6 | 94 | 0.9 |
| Example 16 | FIG. 6 | 12 | 88 | 1.5 |
| Example 17 | FIG. 6 | 30 | 70 | 1.8 |
| Example 18 | FIG. 6 | 52 | 48 | 2 |

Com. Example = Comparative Example

As shown in Table 2, Example 7-Example 9, Example 10-Example 12, Example 13-Example 15, Example 16-Example 18 in which the ratio of the plugged cell is 10% or more show higher purification ratio of HC as compared with that of Comparative Example 3, Comparative Example 4, Comparative Example 5 and Comparative Example 6 having the same plugging pattern respectively and the ratio of the plugged cells is less than 10%. This is because the amount of the exhaust gas passing through the partition walls and the catalyst coating layer coated thereon increases as increasing the number of plugged cells.

Example 19 and Example 20, and Comparative Example 7

The catalytic converters are obtained by the same preparation process with the Example 2, except the average maximum distance of image of the honeycomb structural body is to be 30 μm (Example 19), 15 μm (Example 20), 8 μm (Comparative Example 7). The purification ratio of HC is measured as same with Example 7-Example 9 and Comparative Example 3 as to these catalytic converters, and further the pressure loss at the time of full loading is also measured as same with the Example 1, the results thereof are shown in Table 3. Incidentally, the purification ratio of HC and the pressure loss shown in Table 3 are the relative value in which the purification ratio of the Comparative Example 2 and the pressure loss are to be 1.

Example 21 and Example 22, and Comparative Example 8

The catalytic converters are obtained by the same preparation process with the Example 2, except the porosity of the honeycomb structural body is to be 50% (Example 21), 45% (Example 22) and 35% (Comparative Example 8). The purification ratio of HC is measured as same with Example 7-Example 9 and Comparative Example 3 as to these catalytic converters, and further the pressure loss at the time of full loading is also measured as same with the Example 1, the results thereof are shown in Table 3.

Example 23 and Example 24, and Comparative Example 9

The catalytic converters are obtained by the same preparation process with the Example 2, except the average maximum distance of image of the catalyst coating layer is to be 35 μm (Example 23), 15 μm (Example 24), and 8 μm (Comparative Example 9). The purification ratio of HC is measured as same with Example 7-Example 9 and Comparative Example 3 as to these catalytic converters, and further the pressure loss at the time of full loading is also measured as same with the Example 1, the results thereof are shown in Table 3.

Example 25 and Example 26, and Comparative Example 10

The catalytic converters are obtained by the same preparation process with the Example 2, except the porosity of the catalyst coating layer is to be 50% (Example 25), 45% (Example 26) and 35% (Comparative Example 10). The purification ratio of HC is measured as same with Example 7-Example 9 and Comparative Example 3 as to these catalytic converters, and further the pressure loss at the time of full loading is also measured as same with the Example 1, the results thereof are shown in Table 3.

TABLE 3

|  |  | Honeycomb structural body | | Catalyst coating layer | | | |
|---|---|---|---|---|---|---|---|
|  | Plug type | Average maximum distance of image (μm) | Porosity (%) | Average maximum distance of image (μm) | Porosity (%) | HC purification rate | Pressure loss |
| Com. Example 2 | FIG. 2(a) FIG. 2(b) | 40 | 60 | 5 | 35 | 1 | 1 |
| Example 2 | FIG. 2(a) FIG. 2(b) | 40 | 60 | 45 | 60 | 2.5 | 0.5 |
| Example 19 | FIG. 2(a) FIG. 2(b) | 30 | 60 | 45 | 60 | 2.5 | 0.6 |
| Example 20 | FIG. 2(a) FIG. 2(b) | 15 | 60 | 45 | 60 | 2.5 | 0.8 |
| Com. Example 7 | FIG. 2(a) FIG. 2(b) | 8 | 60 | 45 | 60 | 2.5 | 1.5 |
| Example 21 | FIG. 2(a) FIG. 2(b) | 40 | 50 | 45 | 60 | 2 | 0.6 |
| Example 22 | FIG. 2(a) FIG. 2(b) | 40 | 45 | 45 | 60 | 1.5 | 0.8 |

TABLE 3-continued

| | | Honeycomb structural body | | Catalyst coating layer | | | |
|---|---|---|---|---|---|---|---|
| | Plug type | Average maximum distance of image (μm) | Porosity (%) | Average maximum distance of image (μm) | Porosity (%) | HC purification rate | Pressure loss |
| Com. Example 8 | FIG. 2(a) FIG. 2(b) | 40 | 35 | 45 | 60 | 0.8 | 2.5 |
| Example 23 | FIG. 2(a) FIG. 2(b) | 40 | 60 | 35 | 60 | 2.5 | 0.7 |
| Example 24 | FIG. 2(a) FIG. 2(b) | 40 | 60 | 15 | 60 | 2.5 | 0.9 |
| Com. Example 9 | FIG. 2(a) FIG. 2(b) | 40 | 60 | 8 | 60 | 2.5 | 3 |
| Example 25 | FIG. 2(a) FIG. 2(b) | 40 | 60 | 45 | 50 | 1.9 | 0.8 |
| Example 26 | FIG. 2(a) FIG. 2(b) | 40 | 60 | 45 | 45 | 1.5 | 1 |
| Com. Example 10 | FIG. 2(a) FIG. 2(b) | 40 | 60 | 45 | 35 | 0.8 | 2.5 |

Com. Example = Comparative Example

As shown in Table 3, Example 19 and Example 20, which have the average maximum distance of image of the honeycomb structural body of 10 μm or more, show the low pressure loss as compared with that of Comparative Example 7, which has the average maximum distance of image of the honeycomb structural body of less than 10 μm. This is because the value of the average maximum distance of image is larger, the passing resistance of the exhaust gas at the time of passing the partition walls is lower. And, Example 21 and Example 22, which have the porosity of the honeycomb structural body of 40% or more, show the higher purification ratio of HC and the low pressure loss as compared with that of Comparative Example 8, which has the porosity of the honeycomb structural body of less than 40%. This is because the porosity of the honeycomb structural body is larger, the passing resistance of the exhaust gas at the time of passing the partition walls is lower, and the honeycomb structural body is easily to be heated because the heat capacity thereof is lowered and the light-off performance is improved as the result thereof. Furthermore, Example 23 and Example 24, which have the average maximum distance of image of the catalyst coating layer of 10 μm or more, show the low pressure loss as compared with that of Comparative Example 9, which has the average maximum distance of image of the catalyst coating layer less than 10 μm. This is because the value of the average maximum distance of image of the catalyst coating layer is larger, the passing resistance of the exhaust gas at the time of passing the catalyst coating layer is lower. And, Example 25 and Example 26, which have the porosity of the catalyst coating layer of 40% or more, show the higher purification ratio of HC and the low pressure loss as compared with that of Comparative Example 10, which has the porosity of the catalyst coating layer of less than 40%. This is because the porosity of the catalyst coating layer is larger, the passing resistance of the exhaust gas at the time of passing the catalyst coating layer is lower, and the catalytic converter is easily to be heated because the heat capacity thereof is lowered and the light-off performance is improved as the result thereof.

Example 27-Example 30

The catalytic converter is obtained by the same preparation process with the Example 2, except the amount of the oxides coated ($\gamma$ $Al_2O_3$ and $CeO_2$) per 1 liter of the volume of the honeycomb structural body is adjusted so that the average thickness of the catalyst coating layer coated on the partition walls of the honeycomb structural body is to be 100 μm (Example 27), 80 μm (Example 28), 62 μm (Example 29), 55 μm (Example 30), respectively. The amount of the precious metals per 1 liter of the honeycomb structural body is also unified with that of Example 2. The purification ratio of HC is measured as same with Example 7-Example 9 and Comparative Example 3 as to these catalytic converters, and shown in Table 4. The purification ratio of HC is shown in Table 4. The purification ratio of the HC in the in the Table 4 is the relative value in which the purification ratio of the Comparative Example 2 is to be 1.

TABLE 4

| | Plug type | Average thickness of catalyst coating layer coated on partition wall (μm) | HC purification rate |
|---|---|---|---|
| Com. Example 2 | FIG. 2(a) FIG. 2(b) | — | 1 |
| Example 2 | FIG. 2(a) FIG. 2(b) | 150 | 2.5 |
| Example 27 | FIG. 2(a) FIG. 2(b) | 100 | 2.5 |
| Example 28 | FIG. 2(a) FIG. 2(b) | 80 | 1.5 |
| Example 29 | FIG. 2(a) FIG. 2(b) | 62 | 1.2 |
| Example 30 | FIG. 2(a) FIG. 2(b) | 55 | 1.1 |

Com. Example = Comparative Example

As shown in Table 4, the larger the thickness of the catalyst coating layer, the larger the purification ratio, until in the order of 100 μm. This is because the thicker the catalyst coating layer, the easier the exhaust gas to contact with the precious metals supported on the catalyst coating layer at the time of passing through the catalyst coating layer. To attain the sufficient catalyst performance, it is considered that the thickness of the catalyst coating layer has 60 μm or more is preferable.

Example 31-Example 34

The catalytic converters are obtained by the same preparation process with the Example 2, except the thickness of the partition walls of the honeycomb structural body is to be 0.40 mm (Example 31), 0.31 mm (Example 32), 0.15 mm (Example 33) and 0.10 mm (Example 34). The purification ratio of HC is measured as same with Example 7-Example 9 and Comparative Example 3 as to these catalytic converters, and further the pressure loss at the time of full loading is also measured as same with the Example 1, the results thereof are shown in Table 5. Incidentally, the purification ratio of HC shown in Table 5 is the relative value in which the purification ratio of the Comparative Example 2 is to be 1.

TABLE 5

| | Plug type | Partition wall thickness of honeycomb structural body (mm) | HC purification rate |
| --- | --- | --- | --- |
| Com. Example 2 | FIG. 2(a) FIG. 2(b) | 0.20 | 1 |
| Example 2 | FIG. 2(a) FIG. 2(b) | 0.20 | 2.5 |
| Example 31 | FIG. 2(a) FIG. 2(b) | 0.40 | 1.5 |
| Example 32 | FIG. 2(a) FIG. 2(b) | 0.31 | 2.5 |
| Example 33 | FIG. 2(a) FIG. 2(b) | 0.15 | 2.8 |
| Example 34 | FIG. 2(a) FIG. 2(b) | 0.10 | 3 |

Com. Example = Comparative Example

As shown in Table 5, the thinner the thickness of the partition walls of the honeycomb structural body, the larger the purification ratio. This is because the thinner the thickness of the partition walls of the honeycomb structural body, the lower the heat capacity of the honeycomb structural body, and the catalytic converter is easily to be heated and the light-off performance is improved as the result thereof. To attain the sufficient catalyst performance, it is considered that the thickness of the partition wall has 0.2 mm or less is preferable.

Example 35

The pulverized particles having average particle diameter of 5 μm are obtained by wet pulverizing γ $Al_2O_3$ (the specific surface area of 50 $m^2/g$) and $CeO_2$ having the initial average particle diameter of 150 μm by a ball mill, respectively. The pulverized particles of γ $Al_2O_3$ and $CeO_2$ are mixed in the mass ratio of 4:1, spray drying by an atomizer after the particles are made into slurry, then the three kinds of the secondary particles having the average particle diameter (the secondary average particle diameter) of 50 μm, 40 μm and 30 μm respectively are obtained. Then, Pt and Rh are supported in the pores of the secondary particles by dipping the secondary particle into the solutions containing Pt and Rh. Next, three kinds of coating slurry, that is, the coating slurry A (containing the secondary particle of the average particle diameter of 50 μm), the coating slurry B (containing the secondary particle of the average particle diameter of 40 μm), the coating slurry C (containing the secondary particle of the average particle diameter of 30 μm) are obtained by adding a pore forming agent and a foaming resin to the three kinds of secondary particles which support Pt and Rh, and by further adding acetic acid and water. Among these coating slurry, firstly, the coating slurry A is coated on the partition walls to form the first coating layer, by vacuum aspirating from the outlet end face of the honeycomb structural body which has the same construction with that of used in the Example 1, drying the first coating layer, then, the coating slurry B is coated on the surface of the first coating layer by same process to form the second coating layer on the first coating layer, drying the second coating layer, then, the coating slurry C is coated on the surface of the second coating layer by same process to form the third coating layer on the second coating layer. Then the catalytic converter is completed by drying the third coating layer, forming the catalyst coating layer consisting of three layers by firing by 700° C. for 2 hours. The average maximum distance of image of the first, second and third coating layer are 50 μm, 40 μm and 30 μm, respectively. The amount of the oxides (γ $Al_2O_3$ and $CeO_2$) coated is 400 g per 1 liter volume of the honeycomb structural body, the amount of the precious metals are, 2 g for Pt, and 0.5 g for Rh per 1 liter volume of the honeycomb structural body, respectively. About the catalytic converter, the exhaust amount of CO, HC and NOx are measured as same with the Example 1, then, the measured results are shown in Table 6, in which values are shown as the relative values wherein the measured value of the Comparative Example 1 is expressed as 1.

Example 36

The pulverized particles having average particle diameter of 5 μm are obtained by wet pulverizing γ $Al_2O_3$ (the specific surface area of 50 $m^2/g$), $CeO_2$ and $ZrO_2$ having the initial average particle diameter of 150 μm by a ball mill, respectively. The pulverized particles of γ $Al_2O_3$ and $ZrO_2$ are mixed in the mass ratio of 4:1, spray drying by an atomizer after the particles are made into slurry, then the γ $Al_2O_3 \cdot ZrO_2$ secondary particles having the average particle diameter (the secondary average particle diameter) of 50 μm are obtained. And, pulverized particles of γ $Al_2O_3$ and $CeO_2$ are mixed in the mass ratio of 4:1, spray drying by an atomizer after the particles are made into slurry, then the γ $Al_2O_3 \cdot CeO_2$ secondary particles having the average particle diameter (the secondary average particle diameter) of 40 μm are obtained. Within the obtained two kinds of secondary particle, Rh are supported in the pores of the γ $Al_2O_3 \cdot ZrO_2$ secondary particles by dipping the secondary particle into the solutions containing Rh. Next, the coating slurry D is obtained by adding a pore forming agent and a foaming resin to the γ $Al_2O_3 \cdot ZrO_2$ secondary particles which support Rh, and by further adding acetic acid and water. And Pt and Pd are supported in the pores of the γ $Al_2O_3 \cdot CeO_2$ secondary particles by dipping the secondary particle into the solutions containing Pt and Pd. Next, the coating slurry E is obtained by adding a pore forming agent and a foaming resin to the γ $Al_2O_3 \cdot CeO_2$ secondary particles which support Pt and Pd, and by further adding acetic acid and water. Among these two kinds coating slurry, firstly, the coating slurry D is coated on the partition walls to form the first coating layer, by vacuum aspirating from the outlet end face of the honeycomb structural body which has the same construction with that of used in the Example 1, drying the first coating layer, then, the coating slurry E is coated on the surface of the first coating layer by same process to form the second coating layer on the first coating layer, drying the second coating layer. Then the catalytic converter is completed by drying the second coating layer, forming the catalyst coating layer consisting of two layers by firing by 700° C. for 2 hours. The average maximum distance of image of the first and second coating layer are 50 μm, 40 μm, respectively. The amount of the oxides (γ $Al_2O_3$, $CeO_2$ and $ZrO_2$) coated is 400 g per 1 liter volume of the honeycomb structural body, the amount of the precious metals are, 1 g for Pt, 0.5 g for Rh and 2 g for Pd per 1 liter volume of the honeycomb structural body, respectively. About the catalytic converter, the exhaust amount of CO, HC and NOx are measured as same with the Example 1, then, the measured results are shown in Table 6, in which values are shown as the relative values wherein the measured value of the Comparative Example 1 is expressed as 1.

TABLE 6

|  | Structure of catalyst coating layer | Exhaust amount | | |
|---|---|---|---|---|
|  |  | CO | HC | NOx |
| Example 1 | Single layer | 0.8 | 0.7 | 0.6 |
| Com. Example 1 | Single layer | 1 | 1 | 1 |
| Example 2 | Single layer | 0.5 | 0.4 | 0.2 |
| Com. Example 2 | Single layer | 1.6 | 1.5 | 1.4 |
| Example 35 | Triple layers | 0.4 | 0.4 | 0.5 |
| Example 36 | Double layers | 0.4 | 0.3 | 0.15 |

Com. Example = Comparative Example

As shown in Table 6, Example 35 and Example 36 are lower exhaust amount of CO, HC and NOx and show the excellent purification performance. In Example 35, the average maximum distance of image of the catalyst coating layer which consists three layers is adjusted so that the average maximum distance of image is larger and larger from the surface layer (the layer exposed in the cell) to the base layer (the layer directly contacted to the partition wall), by this, the flow of the exhaust gas passing through the partition wall is to be more uniformly, and the effective utilizing rate of the catalyst coating layer is improved. Also, in Example 36, the catalytic inactivity of Rh is restrained by dividing the Rh and $CeO_2$, which easily form the solid solution, into the different layers in the catalyst coating layer consists of two layers, and the Example 36 shows the especially excellent purification performance for purifying the NOx, by accelerating the NOx decomposition reaction and NOx reduction reaction by Rh. Furthermore, the light-off performance is also excellent because of containing Pd in the surface layer.

Incidentally, examples shown in here are those in which the precious metals are supported in the catalyst coating layer to obtain the catalytic converter having the three-way performance, but those in which metal exchanged zeolite, vanadium oxide, titania and so on are used to obtain the catalytic converter having NOx selective reduction performance, or those in which K and Ba are used to obtain the catalytic converter having NOx occluding and reducing performance, are also show the excellent purifying performance.

INDUSTRIAL APPLICABILITY

The present invention is preferably used as the catalytic converter and a method for producing the same for purifying a treating constituent such as CO, HC, NOx and so on contained in the exhaust gases exhausted from engines for automobile, construction machine and industrial stationary engine.

What is claimed is:

1. A catalytic converter comprising:
   a porous honeycomb structural body having partition walls which divide and form a plurality of cells functioning as fluid passages, each of the fluid passages communicating from one end face to another end face of the associated cell; and
   a catalyst coating layer coated on the partition walls, wherein
   10% or more of the plurality of the cells are plugged by plug portions which are each formed at one end or a middle of an associated passage,
   an average maximum distance of image of the honeycomb structural body is 10 μm or more and a porosity of the honeycomb structural body is 40% or more,
   the catalyst coating layer contains at least one oxide selected from a group consisting of alumina, ceria, titania, silica and zirconia, and also a catalyst containing at least one precious metal selected from a group consisting of platinum, rhodium and palladium, or metal exchanged zeolite or vanadium is supported in the catalyst coating layer as the catalytic active constituent, and
   an average maximum distance of image of the catalyst coating layer is 10 μm or more, and a porosity of the catalyst coating layer is 40% or more.

2. A catalytic converter according to claim 1, wherein the average maximum distance of image of the honeycomb structural body is 40 μm or more and the porosity of the honeycomb structural body is 50% or more.

3. A catalytic converter according to claim 1, wherein the average maximum distance of image of the catalyst coating layer is 40 μm or more, and the porosity of the catalyst coating layer is 50% or more.

4. A catalytic converter according to claim 1, wherein 50% or more of the plurality of the cells are plugged by the plug portions which are formed at the one end or the middle of each of the passages of the honeycomb structural body.

5. A catalytic converter according to claim 1, wherein a thickness of the catalyst coating layer is 60 μm or more.

6. A catalytic converter according to claim 1, wherein a thickness of the partition wall is 0.35 mm or less.

7. A catalytic converter according to claim 1, wherein the catalyst coating layer is also coated on an inner surface of at least one pore of each of the partition walls, the amount of the catalyst coating layer coated on the inner surface of the at least one pore of the partition walls is less than 30% by mass of the total amount of the catalyst coating layer coated on the honeycomb structural body.

8. A catalytic converter according to claim 1, wherein the catalyst coating layer comprises a plurality of layers and each layer has a different kind of the oxides contained and/or the catalytic active constituent supported.

* * * * *